(12) United States Patent
Saidaminov et al.

(10) Patent No.: US 11,105,563 B2
(45) Date of Patent: Aug. 31, 2021

(54) ENERGY STORAGE BY REVERSIBLE INVERSE CRYSTALLIZATION

(71) Applicant: King Abdullah University of Science and Technology, Thuwal (SA)

(72) Inventors: Makhsud Saidaminov, Thuwal (SA); Osman Mohammed Bakr, Thuwal (SA); Michele De Bastiani, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 750 days.

(21) Appl. No.: 15/920,169

(22) Filed: Mar. 13, 2018

(65) Prior Publication Data

US 2018/0299208 A1    Oct. 18, 2018

Related U.S. Application Data

(60) Provisional application No. 62/470,661, filed on Mar. 13, 2017.

(51) Int. Cl.

| | |
|---|---|
| *F28D 20/00* | (2006.01) |
| *G02F 1/01* | (2006.01) |
| *C09K 5/10* | (2006.01) |
| *E06B 9/24* | (2006.01) |
| *G02F 1/00* | (2006.01) |
| *F28D 20/02* | (2006.01) |

(52) U.S. Cl.
CPC .............. *F28D 20/003* (2013.01); *C09K 5/10* (2013.01); *E06B 9/24* (2013.01); *F28D 20/02* (2013.01); *G02F 1/009* (2013.01); *G02F 1/0147* (2013.01); *E06B 2009/2417* (2013.01)

(58) Field of Classification Search
CPC ........ F28D 20/00; F28D 20/003; F28D 20/02; C09K 5/10; E06B 9/24; E06B 2009/2417; G02F 1/009; G02F 1/0147

See application file for complete search history.

(56) References Cited

U.S. PATENT DOCUMENTS

| | | |
|---|---|---|
| 2017/0250030 A1 | 8/2017 | Druffel et al. |
| 2017/0309407 A1 | 10/2017 | Suzuka et al. |

OTHER PUBLICATIONS

Abhat, "Low Temperature Latent Heat Thermal Energy Storage: Heat Storage Materials", Solar Energy vol. 30, 1983, 313-332.
Baetens, "Properties, requirements and possibilities of smart windows for dynamic daylight and solar energy control in buildings: A state-of-the-art review", Solar Energy Materials & Solar Cells 94, 2010, 87-105.
Buttner, et al., "Flash u-fluidics: a rapid prototyping method for fabricating microfluidic devices", The Royal Society of Chemistry, 2016, 6, 74822-74832.
Dallos, et al., "Enthalpies of solution and crystallization of fumaric acid in aqueous solution", J. Chem. Thermodynamics 32,, 2000, 587-595.
Dirin, et al., "Solution-Grown CsPbBr3 Perovskite Single Crystals for Photon Detection", Chemistry of Materials vol. 28, 2016, 8470-8474.
Docampo, et al., "Efficient organometal trihalide perocskite planar-heterojunction solar cells on flexible polymer substrates", Nature Communications, Nov. 12, 2013, 1-6.
Granqvist, "Electrochromics for smart windows: Oxide-based thin films and devices", Thin Solid Films 564, 2014, 1-38.
Granqvist, et al., "Progress in chromogenics: New results for electrochromic and thermochromic materials and levices", Solar Energy Materials & Solar Cells 93, 2009, 2032-2039.
Halder, et al., "Exploring Thermochromic Behavior of Hydrated Hybrid Perovskites in Solar Cells", The Journal of Physical Chemistry Letters, 2015, 6, 3180-3184.
Heo, et al., "Efficient inorganic-organic hybrid heterojunction solar cells containing perovskite compound and polymeric hole conductors", Nature Photonics vol. 7, Jun. 2013, 486-491.
Im, et al., "Growth of CH3NH3PbI3 cuboids with controlled size for high-efficiency perovskite solar cells", Nature Nanotechnology vol. 9, Nov. 2014, 927-932.
International Energy Agency (IEA), "Key World Energy Statistics", 2016, 80 pages.
Jeon, et al., "Solvent engineering for high-performance inorganic-organic perovskite solar cells", Nature Materials vol. 13, Sep. 2014, 897-903.
Jiao, et al., "A fast-switching light writable and electric-erasable negative photoelectrochromic cell based Prussian blue films", Solar Energy Materials & Solar Cells 98, 2012, 154-160.
Kandada, et al., "Nonlinear Carrier Interactions in Lead Halide Perovskites and the Role of Defects", Journal of the American Chemical Society vol. 138, 2016, 13604-13611.
Krasovec, et al., "The Gasochromic Properties of Sol-Gel Wo3 Files with Sputtered Pt Catalyst", Solar Energy vol. 68, No. 6, 2000, 541-551.
Kumar, et al., "Efficient Blue Electroluminescence Using Quantum-Confined Two Dimensional Perovskites", ACS Nano 2016, 20, 9720-9729.
Lee, et al., "Efficient Hybrid Solar Cells Based on Meso-Superstructured Organometal Halide Perovskites", Science Express, Oct. 4, 2012, 1-6.
Leijtens, et al., "Electronic Properties of Meso-Superstructured and Planar Organometal Halide Perovskite Fils: Charge Trapping, Photodoping, and Carrier Mobility", American Chemical Society vol. 8, No. 7, 2014, 7147-7155.
Liu, et al., "Efficient planar heterojunction perovskite solar cells by vapour deposition", Nature vol. 501, Sep. 19, 2013, 395-398.

(Continued)

*Primary Examiner* — Edward M Johnson
(74) *Attorney, Agent, or Firm* — Billion & Armitage

(57) ABSTRACT

Embodiments of the present disclosure describe a method of energy storage and release based on crystallization-dissolution comprising heating a solute-solvent system to decrease a solubility of a solute in the solvent and induce crystal formation; cooling a solute-solvent system to increase the solubility of the solute in the solvent and induce crystal dissolution; wherein energy is stored in the crystal upon heating and released from the crystal upon cooling.

20 Claims, 13 Drawing Sheets

(56) References Cited

OTHER PUBLICATIONS

Luo, et al., "Water photolysis at 12.3% efficiency via perovskite photovoltaics and Earth-abundant catalysts", Science, vol. 345, Issue 6204, Sep. 26, 2014, 1593-1596.

Manser, et al., "Making and Breaking of Lead Halide Perovskites", Accounts of Chemical Research, 2016, 49, 330-338.

Nie, et al., "High-efficiency solution-processed perovskite solar cells with millimeter-scale grains", Solar Cells vol. 347 Issue 6221, Jan. 30, 2015, 522-525.

Noh, et al., "Chemical Management for Colorful, Efficient, and Stable Inorganic-Organic Hybrid Nanostructured Solar Cells", Nano Letters, 2013, 12, 1764-1769.

Nrel, "Best Research-Cell Efficiencies", National Renewable Energy Laboratory, 1 page.

Peng, et al., "Influence of growt temperature on bulk and surface defects in hybrid lead halide perovskite films", The Royal Society of Chemistry, Nanoscale, vol. 8, 2016, 1627-1634.

Sadhanala, et al., "Preparation of Single-Phase Films of $CH_3NH_3Pb(I_{1-x}Br_x)_3$ with Sharp Optical Band Edges", The Journal of Physical Chemistry Letters, 2014, 5, 2501-2505.

Sage, "Thermochromic liquid crystals", Liquid Crystals vol. 38, Nos. 11-12, 2011, 1551-1561.

Saidaminov, et al., "Retrograde solubility of formamidinium and methlammonium lead halide perovskites enabling rapid single crystal growth", The Royal Society of Chemistry, 2015, 51, 17658-17661.

Stranks, et al., "Electron-Hole Diffusion Lengths Exceeding 1 Micrometer in an Organometal Trihalide Perovskite Absorber", Science vol. 342, Oct. 18, 2013, 341-344.

Stranks, et al., "Recombination Kinetics in Organic-Inorganic Perovskites: Excitons, Free Charge, and Subgap States", Physical Review Applied, 2014, 034007-1-034007-8.

Sun, et al., "Nanocrystalline tungsten oxide thin film: Preparation, microstructure, and photochromic behavior", Materials Research Society, vol. 15, No. 4, Apr. 2004, 927-933.

Tan, et al., "Bright light-emitting diodes based on organometal halide perovskite", Nature Nanotechnology vol. 9, Sep. 2014, 687-692.

Tian, et al., "A review of solar collectors and thermal energy storage in solar thermal applications", Applied Energy 104, 2013, 538-553.

Wang, et al., "Switchable Materials for Smart Windows", Annu. Rev. Chem. Biomol. Eng., 2016, 7:283-304.

Xing, et al., "Low-temperature solution-processed wavelength-tunable perovskites for lasing", Nature Materials vol. 13, May 2014, 476-480.

Yakunin, et al., "Detection of gamma photons using solution-grown single crystals of hybrid lead halide perovskites", Nature Photonics, vol. 10, Sep. 2016, 585-589.

Yang, et al., "Thermochemistry and Thermodynamics of Trinitrophloroglucinol Dissolved in DMF and EtOH at 298.15K", Propellants Explos. Pyrotech, vol. 35 2010,, 477-481.

Zhang, et al., "Droplet generation in cross-flow for cost-effective 3D-printed "plug-and-play" microfluidic devices", RSC Adv., 2016, 6, 81120-81129.

Zhumekenov, et al., "Formamidinium Lead Halide Perovskite Crystals with Unprecedented Long Carrier Dynamics and Diffusion Length", ACS Energy Letters, 2016, 32-37.

Saidaminov, et al., "High-quality bulk hybrid perovskite single crystals", Nature Communications |6:7586 |DOI: 10.1038/ncomms8586 |www.nature.com/naturecommunications, Jul. 6, 2015.

ENERGY STORAGE BY REVERSIBLE INVERSE CRYSTALLIZATION

TECHNICAL FIELD

The present disclosure generally relates to solvent-solute systems for the storage and release of energy, such as solar and/or thermal energy.

BACKGROUND

Efforts have been made to collect and store energy in various forms; such as solar energy and/or thermal energy. Solar energy is free, clean and abundant. Over 100 petawatt of solar energy reaches the surface of the Earth, which is ten thousand times greater than the need of a humanity. Photovoltaics can directly convert solar power into electricity. However, photovoltaic panels operate in only sunny daytimes. To this end, solar thermal stations (STS) are being developed which capture maximum energy from sun during the daytime, and release energy upon need at night and/or during cloudy days. An STS consists of a complex system of highly reflective mirrors, which focus the sunlight onto "receiver". The temperatures at the focus point can go above 500° C. In an STS with the energy storage capability, a "receiver" can be either molten-salt or phase change material. They are used to produce steam, then steam is converted into mechanical energy in a turbine, which powers a generator to produce electricity.

The ability to build integrable green energy storage systems would dramatically simplify and cheapen the energy communications. However, there are intrinsic barriers that prevent efforts to achieve this goal. Large area and complex solar concentrators and high operational temperatures make it impossible to integrate STS technology with the buildings. In addition, multiple heat-mechanical-electricity-heat transformations result in drastic energy losses. For these reasons, STS technology is not considered integrable with the buildings. Also, the most modern STSs can store energy only up to 7.5 hours.

Another aspect of building integratable green energy systems is the use of thermochromic materials. Thermochromics (TCs) are a class of materials that change their light transmittance with temperature variation. As a result, thermochromic materials are important for smart windows and camouflage coatings. Smart windows are technologically advanced windows that can switch the transmittance of incident light between transparent and opaque states. This emerging technology can reduce the energy consumption of buildings and can tailor specific camouflage coatings. However, despite the growing interest and potential advantages, state-of-the-art TCs suffer from factors limiting their wide utilization, such as narrow chromatic variation, high operating temperature, and UV-light instability.

Accordingly, there is a need to address the aforementioned deficiencies and inadequacies.

SUMMARY

In general, embodiments of the present disclosure describe a solute-solvent systems for energy storage by reversible inverse crystallization, methods of energy storage and release.

Accordingly, embodiments of the present disclosure describe a method of energy storage and release based on crystallization-dissolution comprising heating a solute-solvent system to decrease a solubility of a solute in the solvent and induce crystal formation and cooling a solute-solvent system to increase the solubility of the solute in the solvent and induce crystal dissolution, wherein energy is stored in the crystal upon heating and released from the crystal upon cooling.

Embodiments of the present disclosure further describe a method of storing energy in and releasing energy from crystals comprising storing energy in crystals formed upon heating a solute-solvent system and releasing energy from the crystals upon cooling the solute-solvent system, wherein an increase in temperature decreases solubility of the solute in the solvent and a decrease in temperature increases solubility of the solute in the solvent.

Embodiments of the present disclosure describe methods of energy storage and release based on crystallization-dissolution comprising selecting a solute-solvent system in which the solubility of the solute in the solvent decreases with the increment of temperature; heating the solute-solvent system thereby inducing formation of the solute into crystals and the loss of solute solubility in the solvent; and cooling the solute-solvent system thereby inducing increased solubility of the solute in the solution.

Embodiments of the present disclosure describe a reversible thermochromic material comprising a first halide perovskite solute and a first solvent, wherein a solubility of the first halide perovskite solute in the first solvent decreases with increasing temperature; and a second halide perovskite solute and a second solvent, wherein a solubility of the second halide perovskite solute in the second solvent decreases with increasing temperature.

Embodiments of the present disclosure describe methods of making reversible thermochromic materials comprising contacting one or more of precursors for a first perovskite solute, precursors for a second perovskite solute, a first solvent, and a second solvent, wherein the first solvent is selected to dissolve the first perovskite solute, wherein the second solvent is selected to dissolve the second perovskite solute; and mixing sufficient to dissolve at least one of the precursors.

Embodiments of the present disclosure describe smart windows comprising at least two substrate materials and a reversible thermochromic material disposed between the at least two substrate materials.

The details of one or more examples are set forth in the description below. Other features, objects, and advantages will be apparent from the description and from the claims.

BRIEF DESCRIPTION OF DRAWINGS

This written disclosure describes illustrative embodiments that are non-limiting and non-exhaustive. In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

Reference is made to illustrative embodiments that are depicted in the figures, in which:

FIG. 2A shows energy stored in the crystal and released back when it is dissolved. FIG. 2B is an energy diagram demonstrating the enthalpy of dissolution. To have exothermic enthalpy of dissolution, enthalpy of hydration should be larger than Lattice enthalpy. FIG. 2C is a diagram showing inverse temperature solubility behavior of a solute. Requirements for certain embodiments are also shown.

FIG. 7A shows heat flow upon dissolving of $MAPbBr_3$ in DMF. Heat is released upon dissolving in pure DMF (first peak), as well in solution (two right peaks). FIG. 7B shows enthalpy of dissolution of $MAPbBr_3$ as a function of solute concentration. $\Delta H_{diss}$ was estimated to be −34 J/g for MAPbBr3-DMF. FIG. 7C depicts the stored energy estimated as a function of temperature, based on loss of solubility and enthalpy of dissolution.

(FIG. 10C) (the scale bar identifies a length of 10 μm), according to one or more embodiments of the present disclosure.

FIG. 12H presents pictures of two prototypes of the window at room temperature (yellow) and at 70° C. degrees (orange), according to one or more embodiments of the present disclosure.

DETAILED DESCRIPTION

The invention of the present disclosure relates to novel systems and methods for, among other things, energy storage by reversible inverse crystallization. For example, embodiments describe a novel concept of energy capture and storage. In an aspect, it is based on inverse temperature crystallization (ITC), termed here "storage of energy in crystals" (SEC). SEC can overcome the aforementioned drawbacks of photovoltaics, solar thermal stations (STS), and thermochromatic materials. To realize the present SEC, a solute-solvent system should fulfill two fundamental requirements: (1) inverse temperature solubility and (2) exothermic enthalpy of dissolution ($\Delta H_{diss}$<0). In SEC, the solar energy during daytime or an increase in temperature induces the formation of crystals out of solution due to inverse temperature crystallization, i.e. the energy is stored in chemical form (bonding energy between atoms in crystals). Later, at lower temperatures (i.e. at night or during cloudy days), or upon a decrease in temperature the crystals dissolve back into solution, thus releasing back the energy due to exothermic enthalpy of dissolution. SEC can operate at mild temperatures (for example, 20-80° C.) and does not require complicated sunlight focusing systems. Therefore, the present technology can be integrated into buildings, among other applications. Moreover, SEC can store energy as long as needed. To do so, the crystals need to be separated from solution to store energy, and when needed, can be mixed again into solution to release the stored energy.

Figure 1:
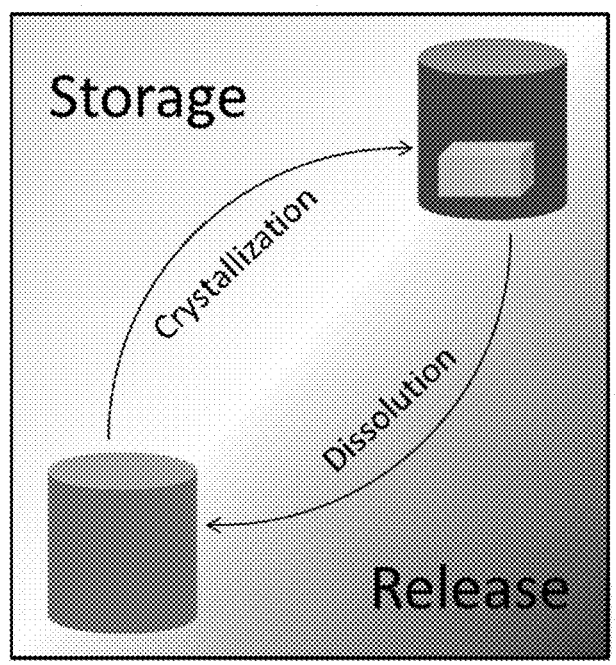
FIG. 1 is a depiction of energy storage and release by a solute-salt pair of the present disclosure, according to one or more embodiments of the present disclosure.

In an embodiment, the novel concept of energy storage of the present disclosure may be based on crystallization-dissolution, termed SEC, as described above. Solar and/or thermal energy can be stored in mild conditions (for example, up to 80° C.) and released upon need without any loss (FIG. 1). The present concept is based on the combination of inverse solubility and exothermic enthalpy of dissolution of certain solute-solvent pairs. Inverse solubility can provide crystallization of the solute (for example, in daytime), while exothermic dissolution can release the heat (for example, at night and during cloudy days).

Examples of solute-solvent pairs demonstrating this concept are provided herein. In a particular aspect the solute-solvent pair can be $MAPbBr_3$-DMF showing its energy storage capacity of 16 MJ/m$^3$, though other solute-solvent pairs can be used. The present solute-solvent systems can be used for various applications. One application is for green energy storage to emerge as a complementary, building integrable solution of energy storage. Another application can be for thermochromic (TC) materials that in an aspect, among others, can be used to reduce energy consumption of buildings.

Figures 2A, 2B, 2C:
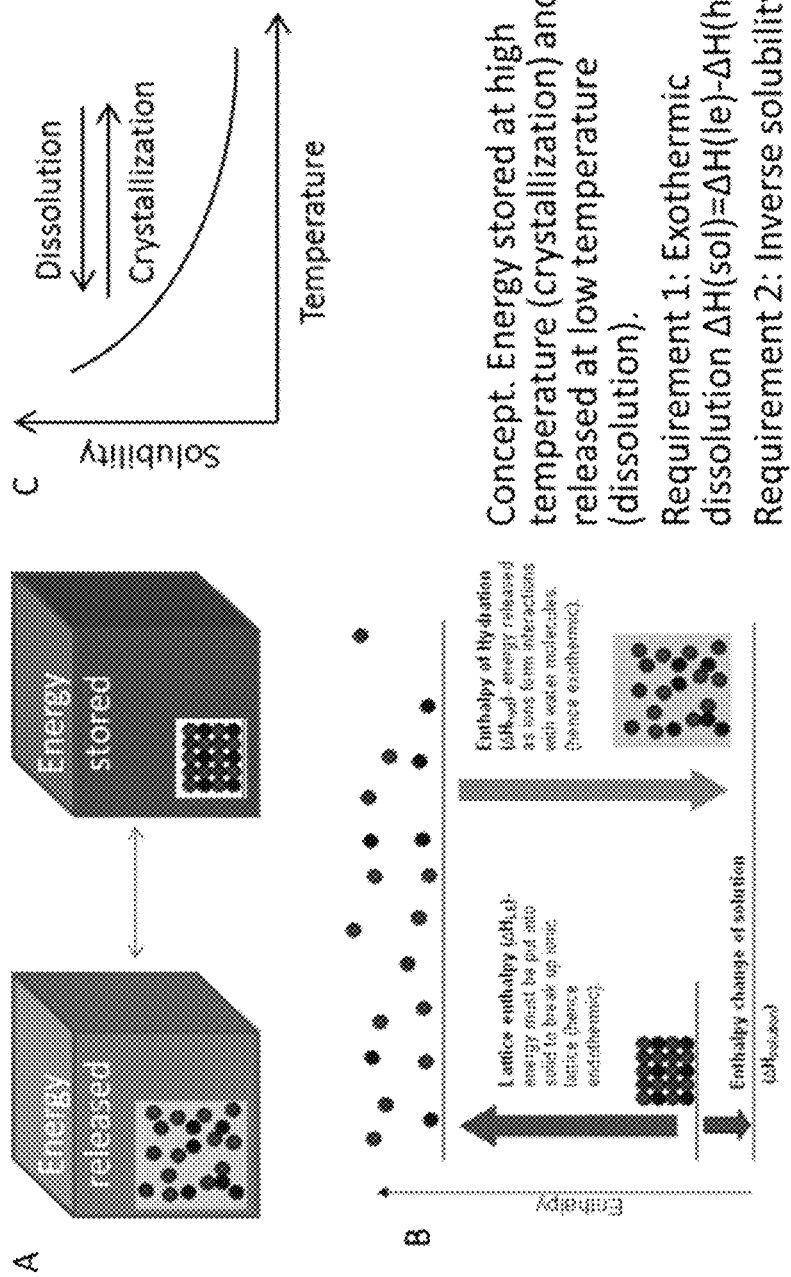
FIGS. 2A-2C depict a concept of storage of energy in crystals, according to one or more embodiments of the present disclosure.

In various aspects, we take advantage of the unusual crystallization behavior of certain solute-solvent pairs to achieve our SEC. In an aspect, we take advantage of certain perovskites, for example halide perovskites. The solubility of perovskites can decrease with increasing temperature due to an inverse temperature crystallization (ITC) process. This can enable the simple growth of perovskite single crystals. This can enable the use of such perovskites for, inter alia, energy storage and release when needed. As shown in FIG. 2A, the solar heat during daytime can induce the formation of crystals, i.e. the energy is stored in chemical bonds of crystals. The heat can be released when the crystals dissolve in a solvent at lower temperatures, i.e. at night or during cloudy days. SEC can operate at mild temperatures (for example, 20-80° C.) and does not require complicated sunlight focusing systems. For these reasons, in an aspect SEC can be integrated with buildings.

To realize SEC, the solute-solvent pair should fulfill two fundamental requirements—exothermic enthalpy of dissolution (ΔHdiss) and inverse temperature solubility. Enthalpy of dissolution is a resultant enthalpy of two phenomena—breaking solute-solute and solvent-solvent attraction (endothermic processes), and forming solvent-solute attractions (exothermic reaction) (FIG. 2B). Depending on the energetics of these phenomena, $\Delta H_{diss}$ can be both endothermic and exothermic. Many solute-solvent systems satisfy the first requirement, i.e. exhibit exothermic $\Delta H_{diss}$. But the second requirement—inverse temperature solubility, i.e. loss of solute solubility upon increasing temperature (FIG. 2C) is more problematic. In various aspects, however, we present herein solute-solvent pairs that also satisfy this second requirement. The majority of solids crystallize at low temperatures and would not be suitable to be used in SEC.

Surprisingly we have found that some solute-solvent systems can be used for SEC. They include $Na_2SO_4$—$H_2O$, $MAPbBr_3$-DMF, $FAPbI_3$-GBL, $CsPbBr_3$-DMSO etc., wherein a solute can be $Na_2SO_4$, $Ce_2(SO_4)_3$, NaCl, NaBr, KCl, KBr, CsCl, CsCl, CsBr, $CsPbBr_3$, CsI, $CsPbI_3$, $MAPbBr_3$ (MA=$CH_3NH_3^+$), $MAPbI_3$, $MAPbCl_3$, $FAPbBr_3$ (FA=$CH(NH_2)_{2+}$), $FAPbI_3$, $FAPbCl_3$, etc, and wherein a solvent can be water, N,N-dimethylformamide (DMF), dimethyl sulfoxide (DMSO), gamma-Butyrolactone (GBL), N-methilformamide (NMF), aldehydes, ketones, organic acids, ethers, esters, alcohols, liquid hydrocarbons (alkanes, alkenes, alkynes, aromatics etc.), halocarbons, etc.

There are several reasons for the advantages of such systems. First, they have relatively high exothermic enthalpy of dissolution. Second, they have high drop of solubility in the temperature range 20° C.-80° C. Third, such pairs show reversible crystallization-dissolution without any degradation. Fourth, these solutes and solvents are cheap, and potentially can be used in industrial applications.

Figure 3:
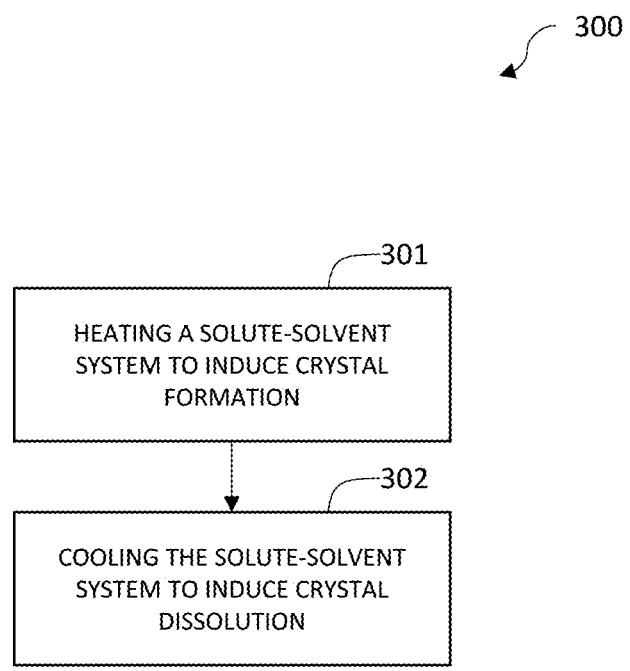
FIG. 3 is a flowchart of a method of energy storage and release based on crystallization-dissolution, according to one or more embodiments of the present disclosure.

FIG. 3 is a flowchart of a method of energy storage and release based on crystallization-dissolution. As shown in FIG. 3, the method may comprise heating 301 a solute-solvent system to decrease a solubility of a solute in the solvent and induce crystal formation and cooling 302 a solute-solvent system to increase the solubility of the solute in the solvent and induce crystal dissolution, wherein energy is stored in the crystal upon heating and released from the crystal upon cooling. In some embodiments (not shown), the method may further comprise separating crystals formed in step 301 and re-adding or re-mixing the crystals with the solution prior to step 302. In this way, the stored energy may be released on-demand (e.g., at any desirable time). As described herein, in some embodiments, the step of heating the solute-solvent system may cause an endothermic enthalpy of dissolution and the step of cooling the solute-solvent system may cause an exothermic enthalpy of dissolution.

At step 301, a solute-solvent system is heated. Heating generally may include increasing a temperature. Any technique known in the art for increasing a temperature may be used. In many embodiments, heating may include irradiating with electromagnetic radiation or using other techniques for heating. For example, in an embodiment, heating may include irradiating with solar energy (e.g., sunlight). In many embodiments, heating includes increasing to a temperature over which a drop in solubility of the solute is observed. For example, in many embodiments, heating includes increasing to a temperature above about 20° C. In an embodiment, heating includes increasing to a temperature of about 120° C. In an embodiment, heating includes increasing to a temperature between about 20° C. to about 120° C. In other embodiments, heating includes increasing to a temperature that may be below about 20° C. or above about 120° C.

The heating of the solute-solvent system may decrease a solubility of a solute in a solvent and induce crystal formation. In this way, the solute-solvent systems of the present disclosure may exhibit inverse temperature solubility or inverse temperature crystallization, wherein an increase in temperature results in a loss of solute solubility in the solvent. For example, as a temperature of the solute-solvent system increases, a solubility of the solute in the solvent may decrease, inducing the formation of crystals out of solution. The crystals formed out of solution may store energy in chemical form or in the form of chemical bonds (e.g., via bonding energy between atoms in crystals). In some embodiments, the heating of the solute-solvent system may be characterized by an endothermic enthalpy of dissolution.

The solute-solvent system may include a solute and a solvent. The solute may include one or more of $Na_2SO_4$, $Ce_2(SO_4)_3$, NaCl, NaBr, KCl, KBr, CsCl, CsCl, CsBr, $CsPbBr_3$, CsI, $CsPbI_3$, $MAPbBr_3$ (MA=$CH_3NH_3^+$), $MAPbI_3$, $MAPbCl_3$, $FAPbBr_3$ (FA=$CH(NH_2)_2^+$), $FAPbI_3$, and $FAPbCl_3$. In an embodiment, the solute is a perovskite. In an embodiment, the solute is a halide perovskite. The solvent may include one or more of water, N,N-dimethylformamide (DMF), dimethyl sulfoxide (DMSO), gamma-Butyrolactone (GBL), N-methilformamide (NMF), aldehydes, ketones, organic acids, ethers, esters, alcohols, hydrocarbons, alkanes, alkenes, alkynes, aromatics, and halocarbons. In an embodiment, the solute-solvent system includes one or more of $Na_2SO_4$—$H_2O$, $MAPbBr_3$-DMF, $FAPbI_3$-GBL, and $CsPbBr_3$-DMSO. These examples shall not be limiting as any of the solutes and solvents may be combined in the present disclosure.

At step 302, the solute-solvent system is cooled. Cooling generally may include decreasing a temperature. Any technique known in the art for decreasing a temperature may be used. In many embodiments, decreasing may include an absence or substantial absence of irradiating with electromagnetic radiation or other known techniques for cooling. For example, in an embodiment, cooling may occur during periods without solar energy (e.g., nighttime) or during periods of cloud cover. In many embodiments, cooling includes decreasing to a temperature over which an increase in solubility of the solute is observed. For example, in an embodiment, cooling includes decreasing to a temperature below about 120° C. In an embodiment, cooling includes decreasing to a temperature below about 80° C. In an embodiment, cooling includes decreasing to a temperature of about or below 25° C.

The cooling of the solute-solvent system may increase a solubility of a solute in a solvent and induce crystal dissolution. As the temperature of the solute-solvent system decreases, the solubility of the solute in the solvent increases, inducing crystal dissolution. As the crystal dissolves in the solvent, the crystal may release energy in a form of heat. In this way, many embodiments include a solute-solvent system that exhibits an exothermic enthalpy of dissolution.

The step 301 of heating and the step 302 of cooling may be used to store and release energy. In many embodiments, energy is stored in the crystal upon heating 301 and released from the crystal upon cooling 302. The heating and cooling of the solute-solvent system, and similarly the storage and release of energy, may occur over a range of about 20° C. to about 120° C.

Figure 4:
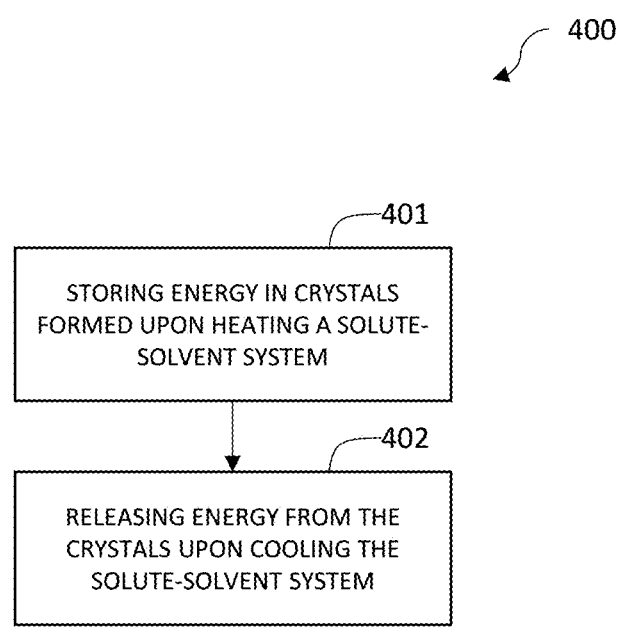
FIG. 4 is a flowchart of a method of storing energy in and releasing energy from crystals, according to one or more embodiments of the present disclosure.

FIG. 4. is a flowchart of a method of storing energy in and releasing energy from crystals, according to one or more embodiments of the present disclosure. As shown in FIG. 4, the method may comprise storing 401 energy in crystals formed upon heating a solute-solvent system and releasing 402 energy from the crystals upon cooling the solute-solvent system, wherein an increase in temperature decreases solubility of the solute in the solvent and a decrease in temperature increases solubility of the solute in the solvent. Any of the embodiments of or features described in the present disclosure may be used herein.

Figure 5:
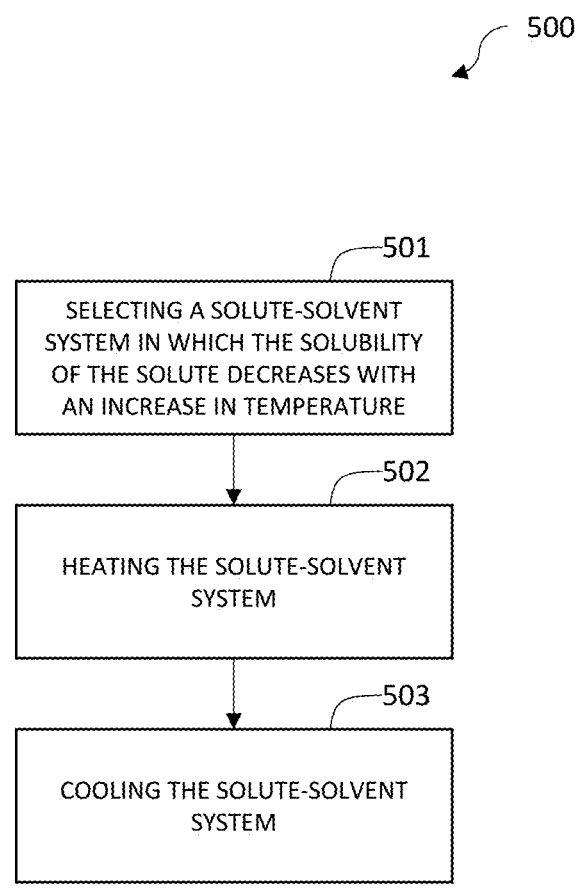
FIG. 5 is a flowchart of a method of energy storage and release based on crystallization-dissolution, according to one or more embodiments of the present disclosure.

FIG. 5 is a flowchart of a method of energy storage and release based on crystallization-dissolution, according to one or more embodiments of the present disclosure. As shown in FIG. 5, the method may comprise selecting 501 a solute-solvent system in which the solubility of the solute in the solvent decreases with the increment of temperature; heating 502 the solute-solvent system thereby inducing formation of the solute into crystals and the loss of solute solubility in the solvent; and cooling 503 the solute-solvent system thereby inducing increased solubility of the solute in the solution.

In certain embodiments, the step of heating the solute-solvent system can cause an endothermic $\Delta H_{diss}$, the step of cooling the solute-solvent system can cause an exothermic $\Delta H_{diss}$, or both.

In certain embodiments, the solute can be a perovskite, halide perovskite, or selected from the group consisting of: $Na_2SO_4$, $Ce_2(SO_4)_3$, NaCl, NaBr, KCl, KBr, CsCl, CsCl, CsBr, $CsPbBr_3$, CsI, $CsPbI_3$, $MAPbBr_3$ ($MA=CH_3NH_3^+$), $MAPbI_3$, $MAPbCl_3$, $FAPbBr_3$ ($FA=CH(NH_2)_2^+$), $FAPbI_3$, $FAPbCl_3$.

In certain embodiments, the solvent can be selected from the group consisting of: water, N,N-dimethylformamide (DMF), dimethyl sulfoxide (DMSO), gamma-Butyrolactone (GBL), N-methilformamide (NMF), aldehydes, ketones, organic acids, ethers, esters, alcohols, hydrocarbons, alkanes, alkenes, alkynes, aromatics, and halocarbons, individually or in combination.

In embodiments, the heating and cooling of the solute-solvent system can be over the range of 20° C.-120° C.

In certain embodiments, the solute-solvent system can be incorporated into a thermochromic material and the thermochromic material can be a smart window.

Embodiments of the present disclosure describe a reversible thermochromic material. In many embodiments, the reversible thermochromic material comprises at least two solute-solvent systems. For example, in an embodiment, the reversible thermochromic material comprises a first halide perovskite solute and a first solvent, wherein a solubility of the first halide perovskite solute in the first solvent decreases with increasing temperature; and a second halide perovskite solute and a second solvent, wherein a solubility of the second halide perovskite solute in the second solvent decreases with increasing temperature. In other embodiments, the reversible thermochromic material may comprise a single solute-solvent system. For example, in an embodiment, the reversible thermochromic material comprises a halide perovskite solute and a solvent, wherein a solubility of the halide perovskite solute in the solvent decreases with increasing temperature.

The first halide perovskite and second halide perovskite may be formed from or include any of the materials (e.g., solutes) of the present disclosure. In many embodiments, the first halide perovskite and the second halide perovskite are different. In an embodiment, the first halide perovskite and the second halide perovskite include one or more of $Na_2SO_4$, $Ce_2(SO_4)_3$, NaCl, NaBr, KCl, KBr, CsCl, CsCl, CsBr, $CsPbBr_3$, CsI, $CsPbI_3$, $MAPbBr_3$ ($MA=CH_3NH_3^+$), $MAPbI_3$, $MAPbCl_3$, $FAPbBr_3$ ($FA=CH(NH_2)_2^+$), $FAPbI_3$, and $FAPbCl_3$.

The first solvent and the second solvent may include any of the solvents of the present disclosure. In many embodiments, the first solvent and the second solvent are different. In an embodiment, the first solvent is a suitable solvent for the first halide perovskite and not a suitable solvent for the second halide perovskite. In an embodiment, the second solvent is a suitable solvent for the second halide perovskite and not a suitable solvent for the first halide perovskite. In an embodiment, the first solvent and the second solvent include one or more of water, N,N-dimethylformamide (DMF), dimethyl sulfoxide (DMSO), gamma-Butyrolactone (GBL), N-methilformamide (NMF), aldehydes, ketones, organic acids, ethers, esters, alcohols, hydrocarbons, alkanes, alkenes, alkynes, aromatics, and halocarbons.

In an embodiment, at least one of the halide perovskites is $MAPbBr_3$ and at least one of the solvents is DMF. In an embodiment, at least one of the halide perovskites is $MAPbI_3$ and at least one of the solvents is GBL The reversible thermochromic materials of the present disclosure may exhibit one or more chromic variations in response to a change in temperature. For example, in an embodiment, the reversible thermochromic material exhibits a chromic variation at about 60° C., wherein the material changes from about yellow to about orange; a chromic variation at about 90° C., wherein the material changes from about orange to about red; and a chromic variation at about 120° C., wherein the material changes from about red to about dark red to about black. In an embodiment, upon cooling from about 120° C. to about room temperature, the reversible thermochromic material exhibits a chromic variation from about black to about red to about orange to about yellow.

Figure 6:
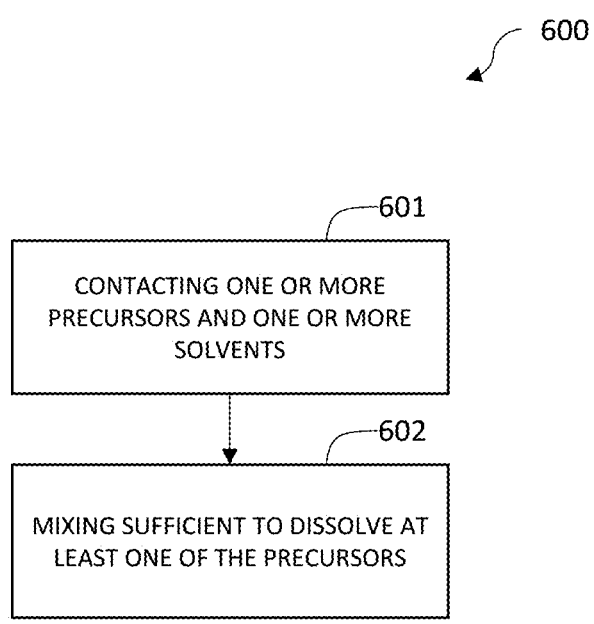
FIG. 6 is a flowchart of a method of making reversible thermochromic materials, according to one or more embodiments of the present disclosure.

FIG. 6 is a flowchart of a method of making reversible thermochromic materials, according to one or more embodiments of the present disclosure. As shown in FIG. 6, the method may comprise contacting 601 one or more of precursors for a first perovskite solute, precursors for a second perovskite solute, a first solvent, and a second solvent, wherein the first solvent is selected to dissolve the first perovskite solute, wherein the second solvent is selected to dissolve the second perovskite solute; and mixing 602 sufficient to dissolve at least one of the precursors. In other embodiments, the method may comprise contacting 601 at least one precursor for a perovskite solute and at least one solvent; and mixing 602 sufficient to dissolve at least one of the precursors. The solute-solvent systems of the method may be selected to exhibit one or more of inverse temperature crystallization and an exothermic enthalpy of dissolution.

At step 601, one or more of precursors for a first perovskite solute, precursors for a second perovskite solute, a first solvent, and a second solvent are contacted. Contacting may generally include the act of touching, making contact, or of bringing to immediate or close proximity, including at the cellular or molecular level, for example, to bring about a physiological reaction, a chemical reaction, or a physical change, e.g., in a solution, in a reaction mixture, in vitro, or in vivo. In many embodiments, one or more of precursors for a first perovskite solute, precursors for a second perovskite solute, a first solvent, and a second solvent are added to a solution sufficient to bring each of the components into immediate or close proximity. In some embodiments, contacting further includes dispersing one or more of the precursors for the first perovskite solute and the second perovskite solute in one or more of the first solvent and the second solvent. For example, in an embodiment, contacting further includes dispersing one or more of the first perovskite solute and the second perovskite solute in a mixture of the first solvent and the second solvent.

The precursors for the perovskite solute, the precursors for the first perovskite solute, and/or the precursors for the second perovskite solute may include any chemical species suitable for forming any of the perovskites or halide perovskites of the present disclosure. In many embodiments, the first perovskite solute is a first halide perovskite solute and the second perovskite solute is a second halide perovskite solute. In these embodiments, the precursors for the first perovskite solute are precursors for a first halide perovskite solute and the precursors for the second perovskite solute are precursors for a second halide perovskite solute.

Similarly, the first solvent and the second solvent may include any of the solvents of the present disclosure. The solvents may be selected based on the perovskite solute or precursors thereof, such that the solute-solvent system exhibits inverse temperature crystallization. In many embodiments, the first solvent is selected to dissolve the first perovskite solute and the second solvent is selected to dissolve the second perovskite solute. In an embodiment, a solubility of the first perovskite solute in the first solvent decreases upon an increase in temperature and increases upon a decrease in temperature. In an embodiment, a solubility of the second perovskite solute in the second solvent decreases upon an increase in temperature and increases upon a decrease in temperature.

In one embodiment, the precursors for the first halide perovskite solute include one or more of $PbI_2$ and MAI, and the precursors for the second halide perovskite solute include one or more of $PbBr_2$ and MABr; and the first solvent is GBL and the second solvent is DMF.

At step 602, at least one of the precursors are dissolved by mixing. Mixing may include any technique known in the art for mixing. In an embodiment, mixing may be achieved by stirring using a stir bar (e.g., a magnetic stir bar). In many embodiments, mixing may dissolve a majority of the precursors (e.g., each of the precursors except one). In other embodiments, mixing may dissolve all of the precursors or less than a majority of the precursors. In many embodiments, a color change is observed upon mixing.

Embodiments of the present disclosure describe a smart window including a reversible thermochromic material. The smart window may comprise at least two substrate materials and a reversible thermochromic material disposed between the at least two substrate materials. The reversible thermochromic material may include any of the solute-solvent systems and/or reversible thermochromic materials of the present disclosure. In many embodiments, the two substrate materials are transparent and/or non-opaque. For example, in an embodiment, the two substrate materials include glass. In other embodiments, at least one of the substrate materials is transparent. In some embodiments, the smart window further comprises a sealant to minimize evaporation. For example, in an embodiment, the sealant is a photo-polymeric spacers.

The following Examples are intended to illustrate the above invention and should not be construed as to narrow its scope. One skilled in the art will readily recognize that the Examiners suggest many other ways in which the invention could be practiced. It should be understand that numerous variations and modifications may be made while remaining within the scope of the invention.

EXAMPLE 1

The present example describes one of the solute-solvent systems that can be used for SEC based on $MAPbBr_3$ as a solute and dimethylformamide (DMF) as a solvent. $MAPbBr_3$ is a methylammonium lead bromide, a halide perovskite.

To synthesize $MAPbX_3$ powder, 0.5M solution containing $PbX_2$ and MAX was prepared in DMF for X=Br, I respectively. The solution was then filtered. Dichloromethane (DCM) was added into solution and precipitated perovskite was filtered and dried at 60° C. overnight. All lead halide salts were purchased from Sigma Aldrich and used without further purification. MAX was purchased from Dyesol in case of X=Br, I. The Cl analog was synthesized following the procedure reported in the literature.

Calorimeter Setaram C80 was used to measure enthalpy of dissolution of samples. Pure DMF was placed in two glass tubes, and equilibrated at 25° C. Then a sample was placed and the enthalpy was measured. The accuracy of the calorimeter was checked by testing the enthalpy of solution of KCl in deionized water. The results were within ±5% accuracy of reported results in literature.

This pair has high exothermic enthalpy of dissolution of 33 J/g (Table 1). Also the solubility at 80° C. is more than two times lower than at 25° C.

TABLE 1

Solute-solvent pairs with inverse temperature solubility behavior and exothermic enthalpy of dissolution.

| Solute | Solvent | ΔHdiss (J/g) | Solubility (g/ml at 25° C.) | Solubility (g/ml at 80° C.) |
|---|---|---|---|---|
| $MAPbBr_3$ | DMF | 33 | 0.7 | 0.3 |

Figures 7A, 7B, 7C:
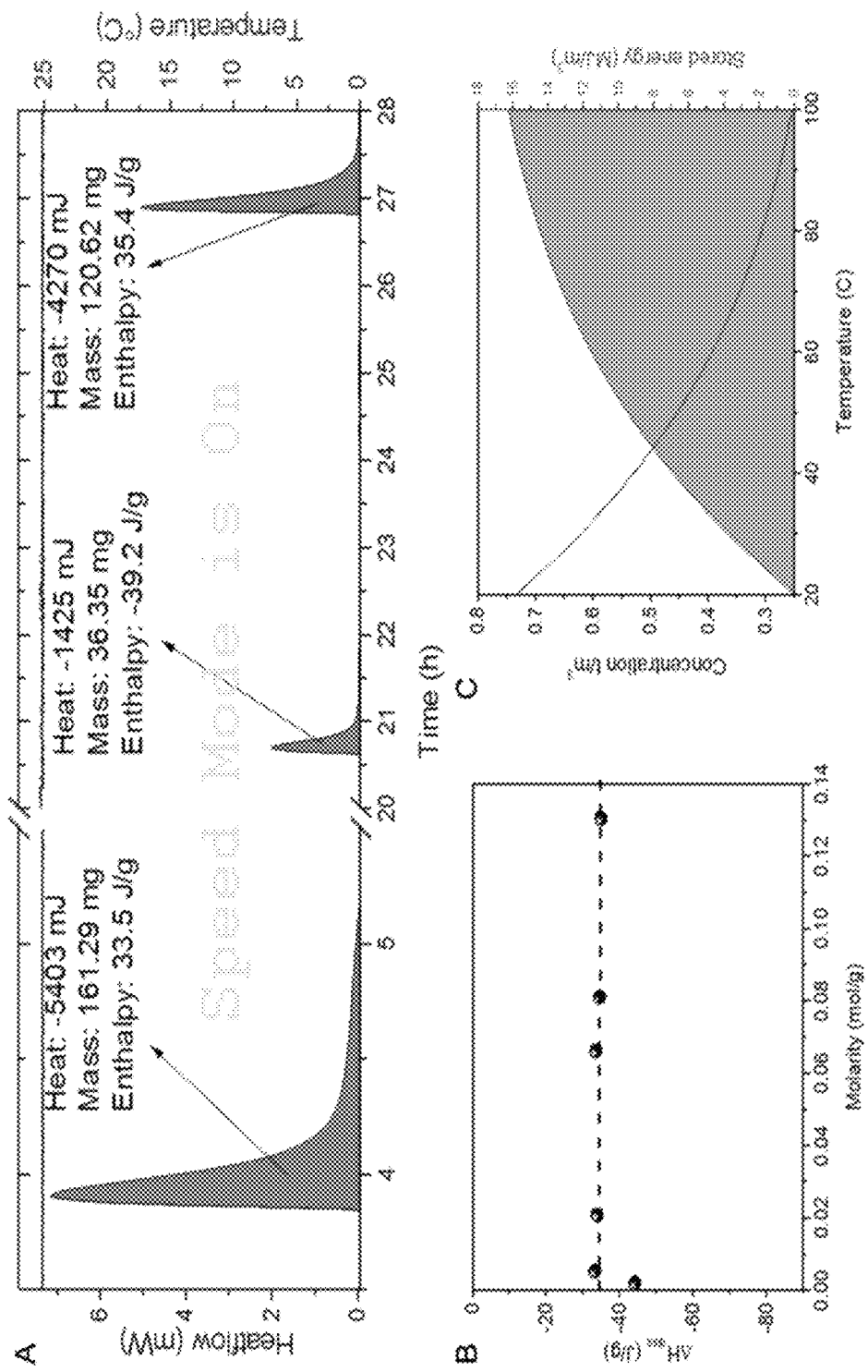
FIGS. 7A-7C show thermodynamics of $MAPbBr_3$ dissolution in DMF, according to one or more embodiments of the present disclosure.

The thermodynamics and kinetics of perovskite dissolution were characterized. FIG. 7A shows experimental calorimetric results, which confirmed the exothermic $\Delta H_{diss}$ of $MAPbBr_3$ in DMF (FIG. 7A). $\Delta H_{diss}$ is −55 J/g at very diluted concentrations (c→0), reaches −44 J/g at c≈2 mM and stabilizes at −34 J/g at c>5 mM (FIG. 7B). Increasing of $|\Delta H_{diss}|$ at diluted concentrations is a normally observed phenomenon. In calculations, we use the value of −34 J/g, was used in the calculations since the solutions used for SEC are in high concentration region. Importantly, when $MAPbBr_3$ is dissolved in solution (not pure solvent), the same enthalpy effect is observed (FIG. 7A). This is important, since in real devices crystallized solute is dissolved back in solution, not in pure solvent.

The calorimetric peak shows a tail, which is due to continuous release of heat. The time of heat release can be adjusted by the concentration of solution. Optionally, the energy can be stored for as long as needed: to do so, the crystals should be isolated from solution. And when needed, their merge will again release the energy back. It is worth noting, that the state of the art STPs can store energy up to 7.5 hours only.

The amount of energy that can be stored by 1 m³ saturated solution of $MAPbBr_3$ in DMF was also estimated. The formula $E=(c^T-c^{20})*\Delta H_{diss}$ is used to estimate the energy capacity, in which $c^T$ and $c^{20}$ are the solute concentration at temperatures T and 20° C., respectively. As shown in FIG. 7C, E increases with the increase of temperature and reaches the value of 16 MJ/m³ at 100° C., or 4.44 KWh. This amount of energy would be enough to for a one bed apartment overnight.

Figure 8:
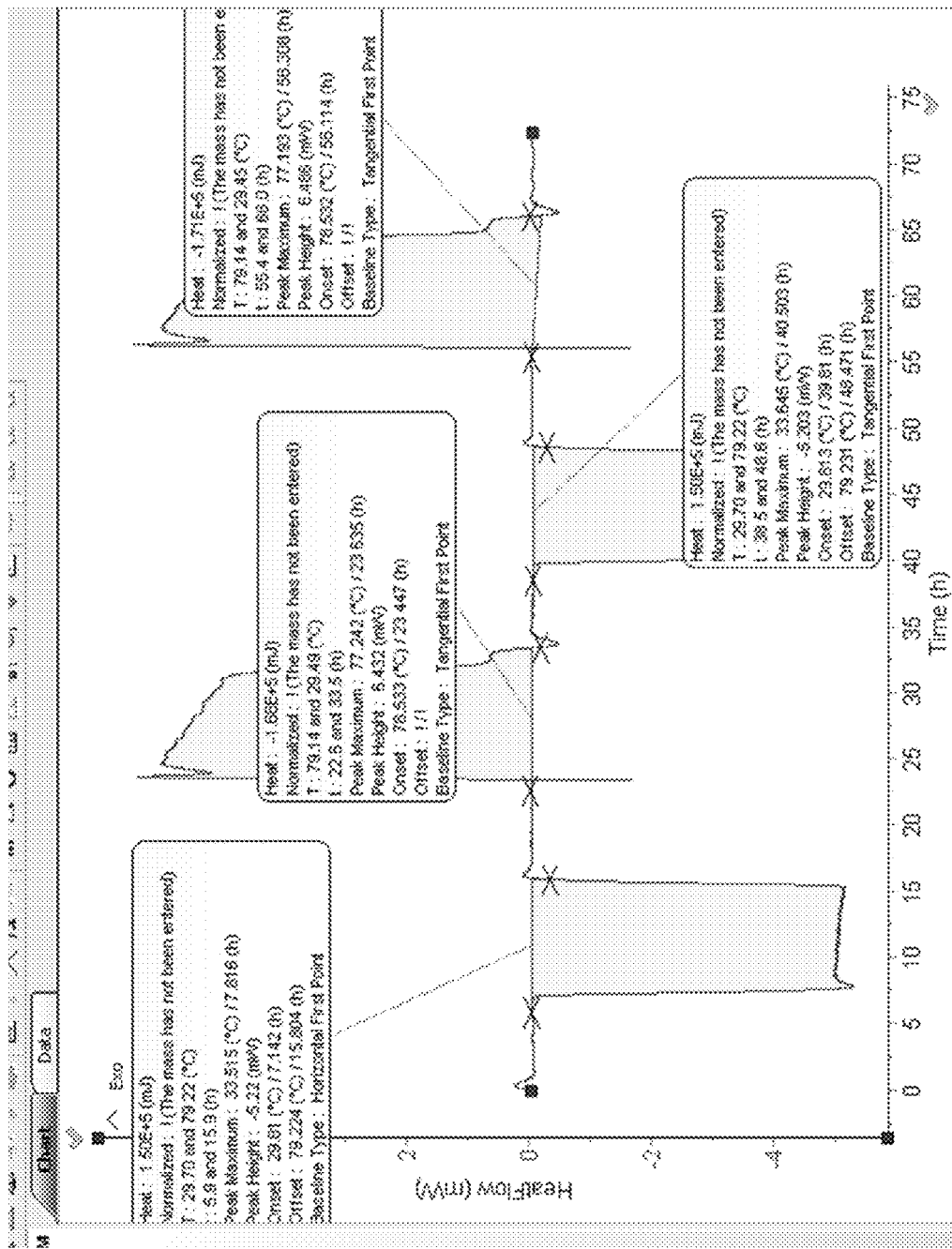
FIG. 8 depicts cycling experiments demonstrating how much energy is absorbed and played back and how much time it takes for perovskite to dissolve back, according to one or more embodiments of the present disclosure.

The SEC device prototype was also tested. The prototype was a sealed glass ampule with sizes of 1 cm diameter and 3 cm height with 2 g of 1.5M perovskite solution inside. The absorbed and released heat was measured for a prototype during the heating to 80° C. and cooling down to 25° C., respectively. As expected, the system absorbed heat upon temperature, simultaneously producing crystals and storing the energy. Upon cooling, the system released heat back. More importantly, the absorbed and released amount of energies was close, evidencing nearly unity heat-chemical energy-heat transformation efficiencies. We also tested the longevity of SEC device; it showed stable behavior during new heating-cooling cycles. See FIG. 8.

To summarize, a novel concept of solar energy storage is provided based on inverse temperature crystallization (ITC) and exothermic enthalpy of dissolution of certain solute-solvent pairs. Even though the current prototype has relatively low power capacity, it has many advantages such as operation at mild temperatures, not requiring special design of materials to keep high temperatures, (for example, complicated concentrators) and also providing energy storage for as long as needed. Nevertheless, the performance of SEC devices can be further enhanced.

Methods

Chemicals and Reagents. All lead halide salts were purchased from Sigma Aldrich and used without further purification. MAX was purchased from Dyesol in case of X=Br, I. The Cl analog was synthesized following the procedure reported in the literature.

Synthesis of $MAPbX_3$ powder. 0.5M solution containing $PbX_2$ and MAX was prepared in DMF or GBL for X=Br, I respectively. The solution was then filtered. DCM was added into solution and precipitated perovskite was filtered and dried at 60° C. overnight.

Measurement and Characterization

Enthalpy of dissolution. Calorimeter Setaram C80 was used to measure enthalpy of dissolution of samples. Pure DMF was placed in two glass tubes, and equilibrated at 25° C. Then a sample was placed and the enthalpy was measured. The accuracy of the calorimeter was checked by testing the enthalpy of solution of KCl in deionized water. The results were within ±5% accuracy of reported results in literature.

For device prototypes, around 2 g of 1.5M perovskite solution was placed in the glass tube, freezed with liquid nitrogen, and sealed.

EXAMPLE 2

The aforementioned concept can also be used to make thermochromic materials such as thermochromic (TC) inks. In an aspect, TC inks can be used for reversible smart windows.

The working mechanism of smart windows is related to the materials employed, i.e. electrochromism, thermochromism, photochromism, or gasochromism. Among these, thermochromics (TCs) has attracted broad interest due to their simple reversible mechanism of using thermal energy for switching transmittance. Typically, commercially available TCs are liquid crystals, and leuco dyes, and recently vanadium dioxide, all of which suffer from the aforementioned disadvantages.

Hybrid halide perovskites recently received significant attention in photovoltaics, due to their unique combination of optoelectronic properties including high carrier mobility, long diffusion length, low trap densities, and power conversion efficiency which is approaching that of crystalline silicon solar cells. Besides the great interest in photovoltaics, a growing curiosity has developed in exploiting other unique properties. Recently, several studies on single crystals have shown that halide perovskites have unusual crystallization behavior.

In this example, the tunable optical properties and unusual crystallization of hybrid lead halide perovskites are exploited to synthesize a reversible thermochromic (TC) ink. The TC shows rich chromatic variations: ranging from yellow to orange, red, and black, when the temperature is increased from 25° C. to 120° C. This enables the application of these inks in thermochromic smart window applications with an unprecedented chromatic range variation.

Interestingly, the crystallization temperature in ITC can depend on the halogen constituent of the perovskite. The tunable optical properties and unusual crystallization processes of perovskites (see below) can be used to design a facile synthesis of TC materials, such as TC inks, that realize smart windows with wider chromatic variation than thought possible in hybrid perovskites.

Figures 9A, 9B, 9C:
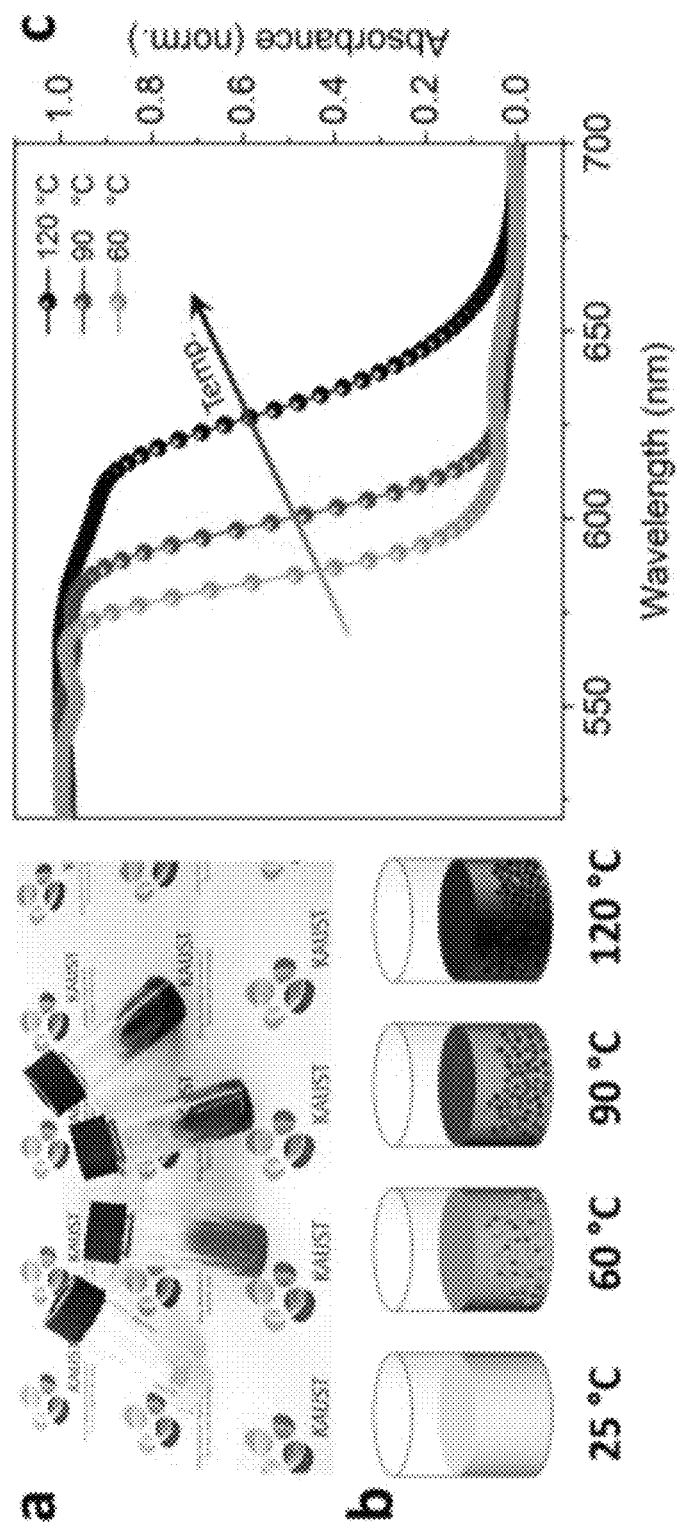
FIGS. 9A-9C depict a photograph (FIG. 9A) and a schematic representation (FIG. 9B), of perovskite TCs at 25° C., 60° C., 90° C., and 120° C. and absorption spectra of the precipitated solids collected from the respective inks (FIG. 9C), according to one or more embodiments of the present disclosure.

To prepare 1 ml of TC ink, 461 mg of lead iodide ($PbI_2$ from Sigma Aldrich, purity 96%), 367 mg of lead bromide ($PbBr_2$ from Sigma Aldrich, purity 98%), 159 mg of methylammonium iodide (MAI, from Dyesol), and 112 mg of methylammonium bromide (MABr, from Dyesol) were dispersed in 1 ml mixture of gamma-butyrolactone (GBL, from Sigma Aldrich) and dimethylformamide (DMF, from Sigma Aldrich) (1:1 by volume) at 70° C. The mixture was stirred until an intense orange color was obtained. Subsequently, the solution was cooled while stirring at room temperature to form a dense yellowish mixture. This yellow ink can be heated to a different temperature to observe the chromatic variation (FIGS. 9A, 9B). The color of the TC ink changes from yellow to orange when the temperature reaches 60° C. In these conditions the solubility changes together with the initial formation of a fine precipitate. The second chromatic variation from orange to bright red occurs when the temperature is increased further to 90° C. Finally, when the temperature reaches 120° C., the color of the mixture turns gradually from dark red to black.

To investigate the optical properties of the perovskite inks, three mixtures are heated to different temperatures (60, 90, and 120° C.) and the colored powders were filtered and collected. FIG. 9C shows the absorption spectra of the powders. The extrapolated edges of absorption spectra are 597 nm for the sample heated at 60° C., 615 nm—at 90° C., and 651 nm—at 120° C. The absorption red shift induced by the increment of the temperature confirms the chromatic variation of the samples.

Figures 10A, 10B, 10C:
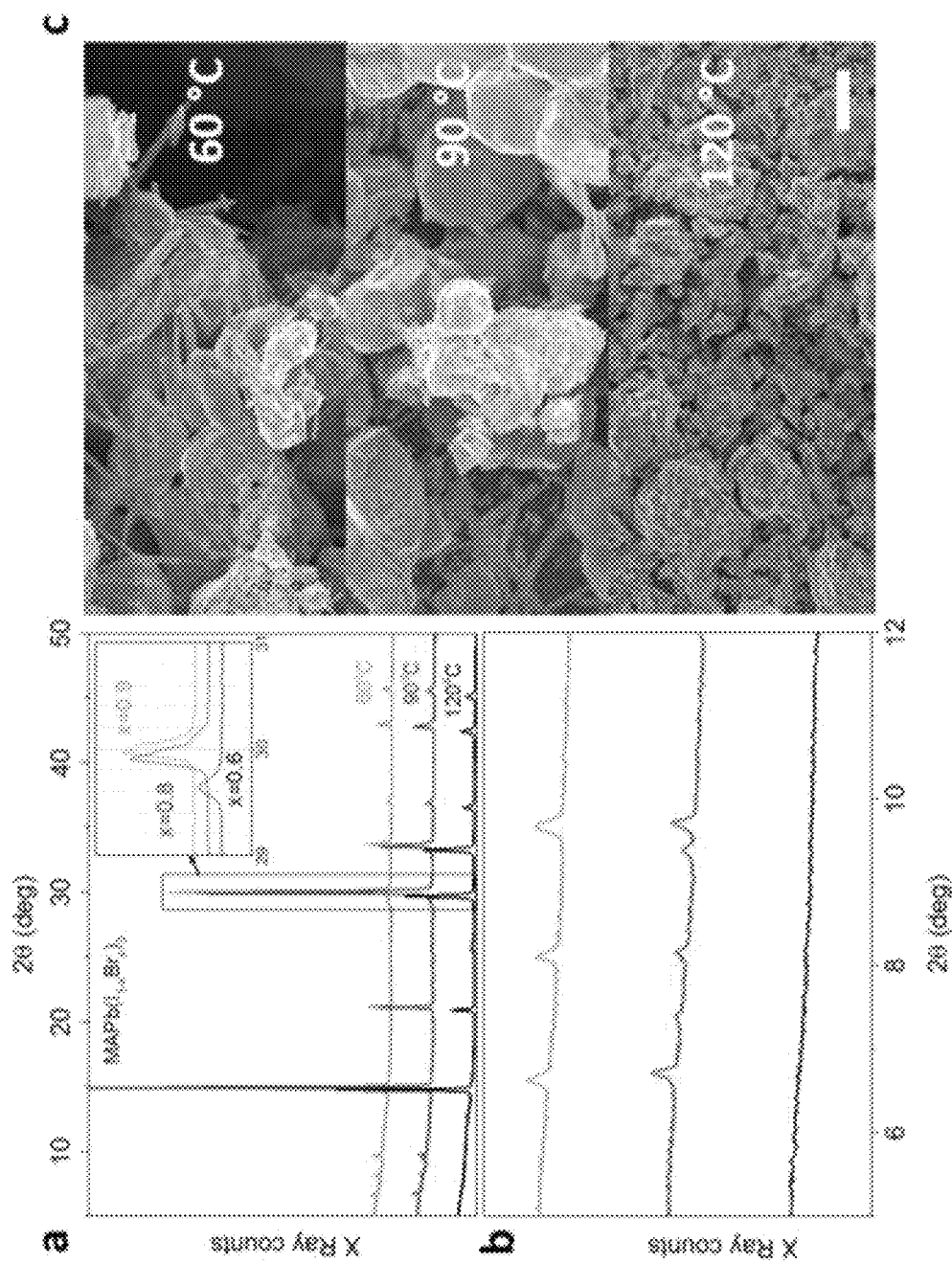
FIGS. 10A-10C depict an XRD pattern of the solids precipitated at different temperatures (FIG. 10A), magnification in the low angle region (FIG. 10B), and SEM images of the solids precipitated at different temperatures of 60° C., 90° C. and 120° C.

To further investigate the mechanism that drives color change of the TC ink, X-Ray Diffraction (XRD) of the collected powders was performed. The XRD patterns are depicted in FIG. 10A.

From the XRD analysis, a gradual shift of the major diffraction peaks to lower angles was observed when the temperature varies from 60 to 120° C. This indicates a gradual dilation of the $MAPbBr_3$ crystal lattice, due to an incremental increase of the proportion of iodine in the perovskite products. Furthermore, impure satellite diffraction peaks were observed in the low angle range (below 10°) emerged in the low-temperature products and then tended to disappear in the products as the temperature increased to 120° C. (FIG. 10B). Simple precursors, such as methylammonium halide and lead halide, were ruled out as contributors to these satellite peaks, while the small angles of these impure peaks are indicative of the formation of crystalline solids with large unit cells. This suggests that these peaks originate from perovskite/solvent complexes, as observed previously in $MAPbI_3$/DMSO complexes. This assumption is also supported by the observation that the impure phases disappeared in the products when the temperature was raised to 120° C., since perovskite/solvent complexes usually produce pure perovskite phase under high temperature annealing with the release of solvent molecules. The SEM images of the collected powder (FIG. 10C) reveal that the size of the crystallites is relatively uniform, with dimensions between 5 and 20 μm, and a cuboidal shape. Interestingly, in the samples obtained at 60° C. and 90° C. the presence of needle-like crystals corresponding to unreacted $PbI_2$ crystals can be observed.

Figure 13:
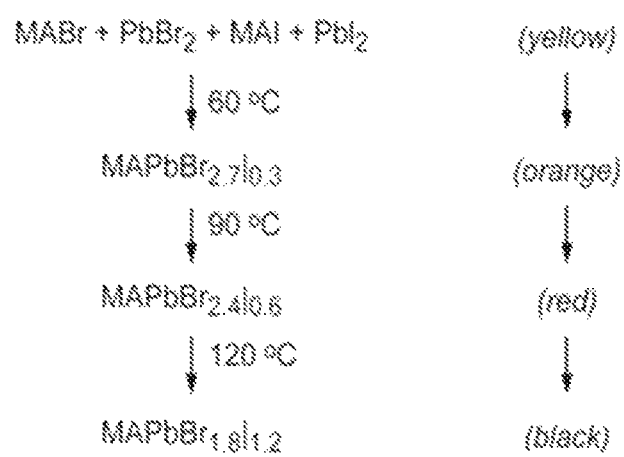
FIG. 13 depicts a scheme describing the composition of inks which drives color, according to one or more embodiments of the present disclosure.

Initially at room temperature, all precursors are dissolved except $PbI_2$, which makes the mixture dense and cloudy, with a pale yellow color. When the temperature is increased to 60° C., $PbI_2$ is completely dissolved due to the maximum solubility of $MAPbI_3$, the consequence is the liquefaction of the dense mixture to a limpid solution. Meanwhile, $MAPbBr_{2.7}I_{0.3}$ is formed due to the decrease of solubility of bromide-based perovskite, which shows orange color. By further increase of temperature, the rapid drop of $MAPbI_3$ solubility results in more incorporation of iodine forming red $MAPbBr_{2.4}I_{0.6}$ at 90° C. and black $MAPb-Br_{1.8}I_{1.2}$ at 120° C. The compositions of the perovskites are estimated from the XRD patterns in accordance with Vegard's law. The shift of XRD peaks also agrees with the bandgap change. The selective formation of a single type of perovskite is not only induced by the temperature but also supported by appropriately selected combination of one or more solvents. Indeed, DMF behaves as a good solvent for the inverse crystallization of $MAPbBr_3$, while behaves like a bad solvent for the crystallization of $MAPbI_3$. On the other hand, GBL behaves as a bad solvent for $MAPbBr_3$ while a good solvent for $MAPbI_3$. The overall process is summarized in FIG. 13.

Figure 11:
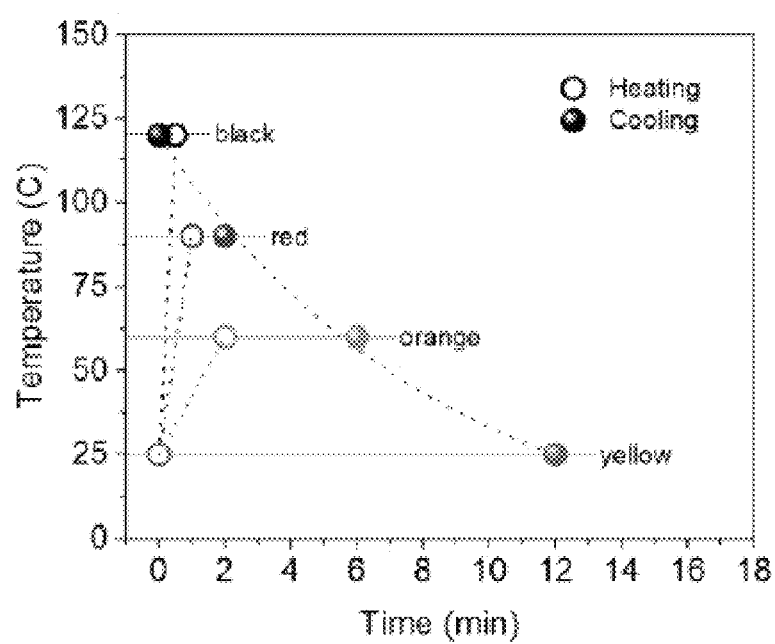
FIG. 11 shows chromatic variation as a function of time and temperature. Hollow dots: heating from 25° C. to the desired temperature. Full dots: cooling from 120° C. to 25° C. The dot-ted fits are a guide for the eye.

This chromatic variation induced by temperature is reversible in the presence of the solvents. During cooling from 120° C. to room temperature the chemical reactions step-back and the color of the mixture changes from black to red, orange and finally yellow. This process also restores the original dense opaque precipitation. The kinetics of the heating and cooling processes are shown in FIG. 11. The time necessary to convert the yellow ink to other specific colors is inversely proportional to the temperature: less than 30 seconds at 120° C. for the black, 1 min at 90° C. for the red, and no more than 2 min at 60° C. for the orange inks. Under stirring conditions, the cooling dynamics of the mixture takes up to 12 min to restore from black to yellow, with intermediate states of red and orange. Without a stirrer, the time necessary to restore the original colors is extended to several hours due to the limited mass transport.

Inspired by the stable reversibility of the mixture, a TC window prototype was created by confining the perovskite ink between two glasses. The point for the reversible reactions, as mentioned earlier, is the presence of the solvent mixture of DMF and GBL. The solvents were preserved without evaporation through well-established photo-polymeric spacers (PPS—from Spot-A Materials) that also acted as a sealant between the glasses of the window.

Figures 12A, 12B, 12C, 12D, 12E, 12F, 12G, 12H:
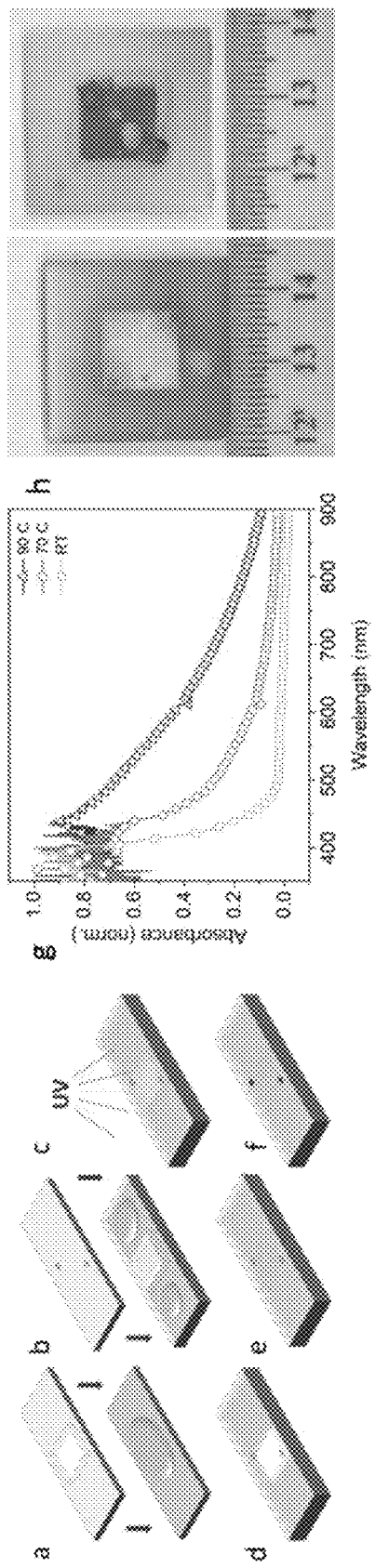
FIGS. 12A-12H depict realization steps of a thermochromic (TC) window (FIGS. 12A-12F), absorption spectra at different temperatures of the TC window (FIG. 12G): 25° C. yellow square, 70° C. orange circles, 90° C. red triangles.

The steps taken to create the TC window are illustrated in FIGS. 12A-12F. First, the liquid PPS was spread over the bottom pre-cleaned glass substrate. A second glass slide was used as a spacer to contain the perovskite mixture: this glass was cut with a $CO_2$ laser to design the active area of the window which in our case was 1 $cm^2$ (FIG. 12A). Another layer of liquid PPS was used to seal the window with the top glass, where two holes (1 mm diameter) were ablated with a $CO_2$ laser for the injection of the ink (FIG. 12B). The PPS was cured through a UV projector to form a solid film. A square shadow mask of 1 $cm^2$ was aligned with the active area of the window. The final thickness of the window was 250 μm (FIG. 12C). The non-cured spacer was removed with a vacuum pump through the holes in the cover glass and washed with isopropanol (FIG. 12D). The TC ink was injected in the active area at a temperature of 70° C. (FIG. 12E), subsequently the holes were sealed with a small amount of fresh PPS (FIG. 12F). The absorption spectra of the TC window are reported in FIG. 12G.

At room temperature the window presents an absorption edge that matches the absorption of lead iodide; the window exhibits an opaque yellow color. Heating the window at 70° C. changes the color of the perovskite mixture red-shifting the absorption edge; the color of the window changes to a semitransparent bright orange. At 90° C. the absorption edge is further extended toward the red part of the visible light; the color of the window tends to a dark red with some variations between orange and black, a sign that the conversion process is not completely homogeneous. The picture of two prototypes at different temperatures, room temperature and 70 C°, are reported in FIG. 12H. When the temperature was increased over 90° C., the color of the window changed to black. However, at this temperature the increment of pressure generated by the solvents can expand the mixture through the PPS, cracking the window.

Thus, it is shown that the unusual crystallization process of perovskites along with their tunable optical properties can be utilized to design a simple synthesis of thermochromic materials, such as (TC) inks, for TC applications. These inks exhibit a completely reversible chromatic variation ranging from yellow to black as temperature increases from 25 to 120° C. These properties provide a new class of smart windows and camouflage coatings with an unprecedented range of color based on hybrid metal halide perovskites.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto Various examples have been described. These and other examples are within the scope of the following claims.

What is claimed is:

1. A reversible thermochromic material, comprising:
   a first halide perovskite solute and a first solvent, wherein a solubility of the first halide perovskite solute in the first solvent decreases with increasing temperature; and
   a second halide perovskite solute and a second solvent, wherein a solubility of the second halide perovskite solute in the second solvent decreases with increasing temperature.

2. The material of claim 1, wherein the first halide perovskite solute and the second halide perovskite solute are different.

3. The material of claim 1, wherein the first halide perovskite solute and the second halide perovskite solute include one or more of $Na_2SO_4$, $Ce_2(SO_4)_3$, NaCl, NaBr, KCl, KBr, CsCl, CsCl, CsBr, $CsPbBr_3$, CsI, $CsPbI_3$, $MAPbBr_3$ (MA=$CH_3NH_3^+$), $MAPbI_3$, $MAPbCl_3$, $FAPbBr_3$ (FA=$CH(NH_2)_2^+$), $FAPbI_3$, and $FAPbCl_3$.

4. The material of claim 1, wherein the first solvent and the second solvent are different.

5. The material of claim 1, wherein the first solvent and the second solvent include one or more of water, N,N-dimethylformamide (DMF), dimethyl sulfoxide (DMSO), gamma-Butyrolactone (GBL), N-methilformamide (NMF), aldehydes, ketones, organic acids, ethers, esters, alcohols, hydrocarbons, alkanes, alkenes, alkynes, aromatics, and halocarbons.

6. The material of claim 1, wherein the material exhibits at least three chromatic variations in response to a change in temperature.

7. The material of claim 6, wherein the change in temperature ranges from about 60° C. to about 120° C.

8. The material of claim 1, wherein the first halide perovskite solute is $MAPbBr_3$, the first solvent is DMF, the second halide perovskite solute is $MAPbI_3$, and the second solvent is GBL.

9. The material of claim 1, wherein the material is incorporated into a smart window.

10. The material of claim 1, wherein the first halide perovskite solute includes at least one of $Na_2SO_4$, $Ce_2(SO_4)_3$, NaCl, NaBr, KCl, KBr, CsCl, CsCl, CsBr, $CsPbBr_3$, CsI, $CsPbI_3$, $MAPbBr_3$ (MA=$CH_3NH_3^+$), $MAPbI_3$, $MAPbCl_3$, $FAPbBr_3$ (FA=$CH(NH_2)_2^+$), $FAPbI_3$, and $FAPbCl_3$.

11. The material of claim 10, wherein the second halide perovskite solute includes at least one of $Na_2SO_4$, $Ce_2(SO_4)_3$, NaCl, NaBr, KCl, KBr, CsCl, CsCl, CsBr, $CsPbBr_3$, CsI, $CsPbI_3$, $MAPbBr_3$ (MA=$CH_3NH_3^+$), $MAPbI_3$, $MAPbCl_3$, $FAPbBr_3$ (FA=$CH(NH_2)_2^+$), $FAPbI_3$, and $FAPbCl_3$. provided that the second halide perovskite solute is different from the first halide perovskite solute.

12. The material of claim 1, wherein the first halide perovskite solute and the first solvent is a first solute-solvent pair having an endothermic enthalpy of dissolution with increasing temperature.

13. The material of claim 12, wherein the first solute-solvent pair has an exothermic enthalpy of dissolution with decreasing temperature.

14. The material of claim 1, wherein the second halide perovskite solute and the second solvent is a second solute-solvent pair having an endothermic enthalpy of dissolution with increasing temperature.

15. The material of claim 14, wherein the second solute-solvent pair has an exothermic enthalpy of dissolution with decreasing temperature.

16. The material of claim 1, wherein the first halide perovskite solute is not soluble in the second solvent at any temperature.

17. The material of claim 1, wherein the second halide perovskite solute is not soluble in the first solvent at any temperature.

18. A window comprising: at least two substrate materials and a reversible thermochromic material according to claim 1 disposed between the at least two substrate materials.

19. The window of claim 18, wherein the substrate materials include glass.

20. The window of claim 18, wherein the substrate materials are transparent or non-opaque.

* * * * *